(12) United States Patent
Avital et al.

(10) Patent No.: US 8,817,657 B2
(45) Date of Patent: Aug. 26, 2014

(54) TECHNIQUES FOR ENHANCED NETWORK DISCOVERY

(75) Inventors: Shlomo Avital, Jerusalem (IL); Avishay Sharaga, Beit Nehemya (IL)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 12/290,902

(22) Filed: Nov. 4, 2008

(65) Prior Publication Data

US 2010/0111053 A1 May 6, 2010

(51) Int. Cl.
*H04W 8/02* (2009.01)

(52) U.S. Cl.
USPC .......................... 370/254; 370/338; 370/351

(58) Field of Classification Search
USPC .......................................... 370/338, 255, 331
See application file for complete search history.

(56) References Cited

U.S. PATENT DOCUMENTS

| 5,982,758 | A * | 11/1999 | Hamdy | 370/331 |
| 7,940,726 | B2 * | 5/2011 | Olsson et al. | 370/331 |
| 8,249,505 | B1 * | 8/2012 | Goldner et al. | 455/41.2 |
| 2008/0151851 | A1 * | 6/2008 | Sitch | 370/338 |
| 2009/0279503 | A1 * | 11/2009 | Chin et al. | 370/331 |
| 2009/0285176 | A1 * | 11/2009 | Zheng et al. | 370/331 |

* cited by examiner

*Primary Examiner* — Donald Mills
*Assistant Examiner* — Henry Baron
(74) *Attorney, Agent, or Firm* — Thorpe North & Western LLP

(57) ABSTRACT

An embodiment of the present invention provides a method, comprising retrieving a first network scan while connected to a second network access point (AP), without actually accessing the air, by the AP sending a message to "Get first network base station (BS) list" to devices in communication with the AP and operable to communicate in the first and the second networks, merging by the AP all answers from the devices to provide a list of all base stations (BS's) in the AP's vicinity, and querying the AP by other devices for the network BS list.

21 Claims, 1 Drawing Sheet

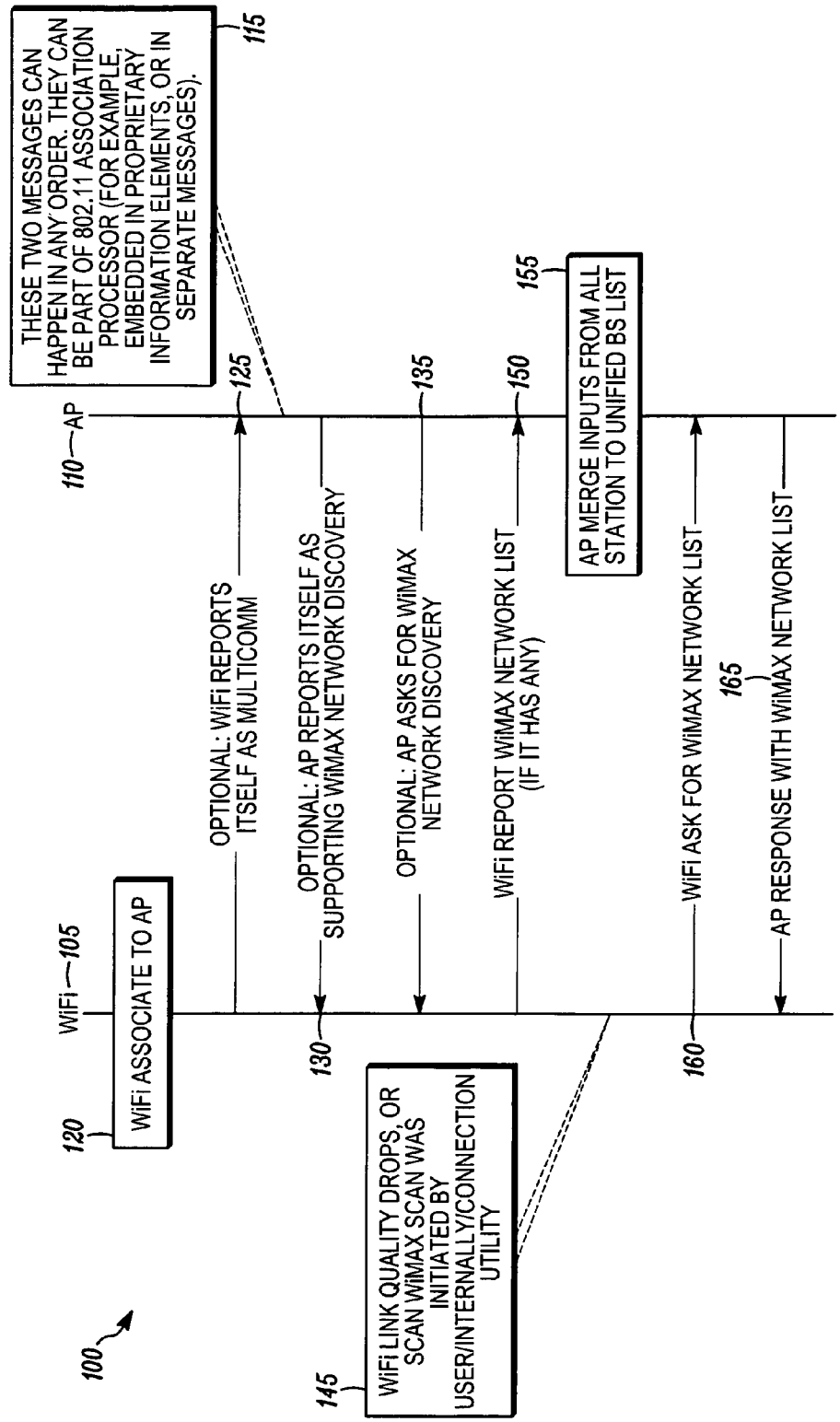

TECHNIQUES FOR ENHANCED NETWORK DISCOVERY

BACKGROUND

Wireless Multicomm devices may include a network adapter that combines more then one wireless technology (each wireless technology may be referred as a 'comm'). The different wireless comms might share some of the hardware components on the device (such radio, antennas etc). Sharing hardware components might limit the usage of the device in a way that at a given time, only one of the wireless comms can use the hardware to transmit or receive. On other platforms there might be two separate comms (for example, but not limited to, networks conforming to the Institute for Electronic and Electrical Engineer's (IEEE) 802.16 (WiMAX) network and networks conforming to the IEEE 802.11 (WiFi) network), that does not share any HW components, but still the ability of both comms to transmit and receive simultaneously might be limited due to mutual (RF) interference.

Thus, a strong need exists for techniques for enhanced network discovery.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates an algorithm according to one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a method for retrieving the WiMAX network scan while connected to a WiFi AP, without actually accessing the air. Looking at FIG. 1, shown generally as 100, is the flow of an embodiment of the present invention:

1. Optional>When a device associates to AP 110, it reports its capabilities as a "multicomm" device 125 (again it is understood that this is an optional feature of the present invention). Also optional is the AP 110 reporting itself as supporting WiMAX network discovery 130. These messages may happen in any order and, in an embodiment of the present invention, may be part of an 802.11 association process (or embedded in proprietary information elements, or in a separate message).

2. The AP 110 sends the message "Get WiMAX BS list" to a device, such as a wireless station. Some of the stations will have such a list when the command arrives, and some will not.

3. The AP can merge all answers from different devices to a "full" picture of all base stations in its vicinity 155.

4. Other devices, such as other wireless stations, may query the AP for "WiMAX BS List" 160 (it can do this for example when its link quality drops, and there is no WiFi roaming candidates, or when user pressed the WiMAX scan button 145). Since the AP is fixed (as is the BS), over time the AP will have full and accurate WiMAX BS list in its vicinity. At 165 the AP responds with the WiMAX network list.

5. The device can use the received list to optimize its scanning algorithm and its power consumption—if the BS received from the AP is fresh enough, it may be presented to the user, if not the list may be used to do a WiMax scan according to the parameters in the list ensuring it will be short and efficient.

Embodiments herein described may shorten the handover moving from WiFi to WiMAX (save scanning). Further, it can be used to avoid "scan while work" scanning in multicomm device. (This might degrade WiFi performance). Lastly, it may save WiMAX Idle Power (single handshake with AP instead of WiMAX scan).

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method, comprising:

retrieving, by an access point (AP) in a second network, a list of base stations (BSs) in a first network from multicomm wireless devices having the list without accessing a BS in the first network, wherein the AP requests the list from the multicomm wireless devices in communication with the AP in the second network, wherein each list of BS in the first network is generated from a BS scan of the first network by the multicomm wireless device, wherein the multicomm wireless devices are operable to communicate in the first and the second networks, and the first network uses a wireless standard different from the second network;

merging, by the AP in the second network, responses from the multicomm wireless devices to form a merged list of base stations in the first network that are in a vicinity of the AP in the second network; and querying the AP in the second network by other multicomm wireless devices for the merged list of base stations in the first network to enable the other multicomm wireless devices to identify the base stations in the first network that are in the vicinity of the AP without directly communicating with the base stations.

2. The method of claim 1, wherein the first network is a network conforming to the Institute for Electronic and Electrical Engineer's (IEEE) 802.16 (WiMAX) network and the second network is a networking conforming to the IEEE 802.11 (WiFi) network and the merged list of base stations is a WiMAX BS list.

3. The method of claim 2, further comprising reporting by the multicomm wireless devices or the other multicomm wireless devices their capabilities as multicomm devices when the multicomm wireless devices or the other multicomm wireless devices associate with the second network AP, wherein the multicomm devices and the other multicomm wireless devices can communicate using a WiMAX communication protocol and a WiFi communication protocol.

4. The method of claim 2, wherein each multicomm wireless device has the list of BSs in the first network and the other multicomm wireless devices do not have the list of BSs in the first network prior to the AP in the second network retrieving the list of BSs in the first network from multicomm wireless devices having the list.

5. The method of claim 2, wherein the other multicomm wireless devices query the AP in the second network for the WiMAX BS list when a link quality of the other multicomm wireless devices drops, and no WiFi roaming AP candidates are available for establishing a link or when a user presses a WiMAX scan button.

6. The method of claim 3, wherein the other multicomm wireless devices use the received WiMAX BS list to optimize their scanning algorithm and reduce power consumption.

7. The method of claim 3, wherein if the WiMAX BS list received from the second network (WiFi) AP has a time stamp within a predetermined time, the WiMAX BS list is used to access WiMAX BSs by the other multicomm wireless devices, otherwise, the WiMAX BS list is used to perform a WiMAX scan according to parameters in the WiMAX BS list ensuring a short and efficient WiMAX scan.

8. An apparatus, comprising:
an access point (AP) in a second network for requesting a list of base stations (BSs) in a first network from multicomm wireless devices in communication with the second network AP, retrieving the list from the multicomm wireless devices having the list without accessing a first network BS, wherein each list of BS in the first network is generated from a BS scan of the first network by the multicomm wireless device, wherein the first network uses a wireless standard different from the second network;
merging responses from the multicomm wireless devices to generate a merged list of BSs in the first network that are in a vicinity of the AP in the second network; and
providing the merged list of BSs in the first network to other multicomm wireless devices in response to a query by other multicomm wireless devices, to enable the other multicomm wireless devices to identify the base stations in the first network that are in the vicinity of the AP without directly communicating with the base stations.

9. The apparatus of claim 8, wherein the first network is a network conforming to the Institute for Electronic and Electrical Engineer's (IEEE) 802.16 (WiMAX) network and the second network is a networking conforming to the IEEE 802.11 (WiFi) network and the merged list of base stations is a WiMAX BS list.

10. The apparatus of claim 9, wherein the AP in the second network is configured to receive a report by the multicomm wireless devices and other multicomm wireless devices of their capabilities as multicomm devices when the multicomm wireless devices and other multicomm wireless devices associate with the second network AP, wherein the multicomm wireless devices and the other multicomm wireless devices can communicate using a WiMAX communication protocol and a WiFi communication protocol.

11. The apparatus of claim 10, wherein each multicomm wireless device has the list of BSs in the first network and the other multicomm wireless devices do not have the list of BSs in the first network prior to the AP in the second network retrieving the list of BSs in the first network from multicomm wireless devices having the list.

12. The apparatus of claim 10, wherein the AP in the second network is configured to provide the WiMAX BS list to a multicomm wireless device when a link quality with the multicomm wireless device drops and no WiFi roaming AP candidates are available for establishing a link.

13. The apparatus of claim 11, wherein the AP in the second network provides the WiMAX BS list to optimize a scanning algorithm and reduce power consumption in other multicomm wireless devices.

14. The apparatus of claim 11, wherein the AP in the second network provides a time stamp to other multicomm wireless devices when the WiMAX BS list is generated so the WiMAX BS list can be used to access WiMAX BSs by the other multicomm wireless devices within a predetermined time using the time stamp, otherwise, the WiMAX BS list can be used by the other multicomm wireless devices to perform a WiMAX scan according to parameters in the WiMAX BS list ensuring a short and efficient WiMAX scan.

15. A non-transitory machine-accessible medium that provides instructions, which when accessed, cause a machine to perform operations comprising:
retrieving, by an access point (AP) in a second network, a list of base stations (BSs) in a first network from multicomm wireless devices having the list without accessing a BS in the first network, wherein the AP in the second network requests the list from the multicomm wireless devices in communication with the AP in the second network, wherein each list of BS in the first network is generated from a BS scan of the first network by the multicomm wireless device, wherein the multicomm wireless devices are operable to communicate in the first and the second networks, and the first network uses a wireless standard different from the second network;
merging, by the AP in the second network, responses from the multicomm wireless devices to form a merged list of base stations in the first network that are in a vicinity of the AP in the second network; and
querying the AP in the second network by other multicomm wireless devices for the merged list of base stations in the first network to enable the other multicomm wireless devices to identify the base stations in the first network that are in the vicinity of the AP without directly communicating with the base stations.

16. The non-transitory machine-accessible medium of claim 15, wherein the first network is a network conforming to the Institute for Electronic and Electrical Engineers (IEEE) 802.16 (WiMAX) network and the second network is a networking conforming to the IEEE 802.11 (WiFi) network and the merged list of base stations is a WiMAX BS list.

17. The non-transitory machine-accessible medium of claim 16, further comprising said instructions causing said machine to perform operations further comprising reporting by the multicomm wireless devices or the other multicomm wireless devices their capabilities as multicomm devices when the multicomm wireless devices or the other multicomm wireless devices associate with the second network AP wherein the multicomm devices can communicate using a WiMAX communication protocol and a WiFi communication protocol.

18. The non-transitory machine-accessible medium of claim 16, wherein each multicomm wireless device has the list of BSs in the first network and the other multicomm wireless devices do not have the list of BSs in the first network prior to the AP in the second network retrieving list of BSs in the first network from multicomm wireless devices having the list.

19. The non-transitory machine-accessible medium of claim 16, wherein the other devices query the AP in the second network for the WiMAX BS list when a link quality of the other multicomm wireless devices drops, and no WiFi roaming AP candidates are available for establishing a link or when a user presses a WiMAX scan button.

20. The non-transitory machine-accessible medium of claim 17, wherein the other multicomm wireless devices use the received WiMAX BS list to optimize their scanning algorithm and reduce power consumption.

21. The non-transitory machine-accessible medium of claim 17, wherein if the WiMAX BS list received from the second network (WiFi) AP has a time stamp within a predetermined time, the WiMAX BS list is used to access WiMAX BSs by the other multicomm wireless devices, otherwise, the WiMAX BS list is used to perform a WiMAX scan according to parameters in the WiMAX BS list ensuring a short and efficient WiMAX scan.

\* \* \* \* \*